Nov. 9, 1954 — W. S. MARTIN — 2,693,873
SCREW CONVEYER

Filed April 26, 1951 — 2 Sheets-Sheet 1

INVENTOR
WARREN S. MARTIN
BY
Louis L. Ansart
his ATTORNEY

Nov. 9, 1954

W. S. MARTIN 2,693,873

SCREW CONVEYER

Filed April 26, 1951

INVENTOR
WARREN S. MARTIN
BY
ATTORNEY

United States Patent Office 2,693,873
Patented Nov. 9, 1954

2,693,873

SCREW CONVEYER

Warren S. Martin, Massapequa, N. Y.

Application April 26, 1951, Serial No. 222,991

9 Claims. (Cl. 198—213)

The present invention relates to improvements in material conveyors and more particularly to improvements in screw conveyors to adapt them for handling difficult materials.

Heretofore use has been made of screw conveyors which comprises a conveyor screw or spiral mounted to rotate about an axis so positioned that the operative part of the screw fits in a circular-cross-section bottom portion of a casing of general U-shape, or in a casing of circular cross section. The operating positions of such units are approximately horizontal, and the material being conveyed seeks, due to gravity, the lower part of the casing. When the screw is revolved its cam action in connection with the gravitational force will tend to advance the material. Still another form of the screw conveyor presently in use comprises a conveyor screw partially or totally submerged in the material to be handled. The rotary motion of the screw will tend to shift the adjacent material toward one end of the screw by the cam action of the screw thread or flights where the mass of material presents resistance to a rotary movement of the material within the confines of the screw flights.

Screw conveyors of conventional designs operate very efficiently with granular or finely divided materials provided such materials will flow along the screw thread or flights under the influence of gravity. Some materials tend to pack, bridge or stick to the screw, and after the volume confines of the flights have been entirely filled, such packed in material and the screw will rotate together thus rendering the unit ineffective or inoperative until it is cleared.

An important object of the invention is to provide a material conveyor comprising a screw conveyor and a device operating in cooperation therewith for continuously clearing the advancing component of the conveyor screw.

Another object of the invention is to provide a screw conveyor for feeding material vertically, horizontally or in intermediate directions.

Still another object of the invention is to provide a screw conveyor comprising a conveyor screw and means cooperating therewith to forcibly advance difficult materials along the conveyor screw.

In carrying out the invention use may be made of a screw conveyor comprising a shaft whose axis is the axis of the conveyor screw, and a series of helicoid feed flights in the form of a strip or blade of substantially uniform thickness attached to said shaft edgewise in helical or spiral relation; and a hollow cylindrical control spiral comprising a shaft and a strip or blade of substantially uniform thickness supported by said shaft and arranged in cylindrical form around the axis of said shaft in an open helical or spiral arrangement of opposite pitch to that of the screw conveyor. The formation of the cylindrical spiral is thus provided with a helical space or slot to accommodate a loose rotary intermeshing of said helicoid flights. The control spiral is mounted to rotate in opposite directions and with intermeshing relationship to said screw conveyor whereby the strip of the control spiral extends between successive convolutions or flights of said screw conveyor.

The leading or forward faces of the feed flights tend to convey the material forward by its screw action while the intermeshing portion of the control spiral provides a series of running working surfaces opposing a rotary movement of the material being pressed forward by the feed flights. In this cooperation the control spiral tends to force the material to advance along the helical flights by restraining a rotary movement of the material with respect to the rotary movement of the helical flights.

In conveyors for use in horizontal or nearly horizontal position, the principal use of the control spiral is to enable the use of the conveyor to feed sticky material. Where the conveyor is used in vertical position, the material in the space above each convolution or flight of the screw conveyor and limited by the control spiral and casing is gradually forced upwardly. For vertical conveying the control spiral is necessary regardless of the character of the material.

Other objects, features and advantages will appear upon consideration of the following detailed description and of the drawings in which.

Figure 1:
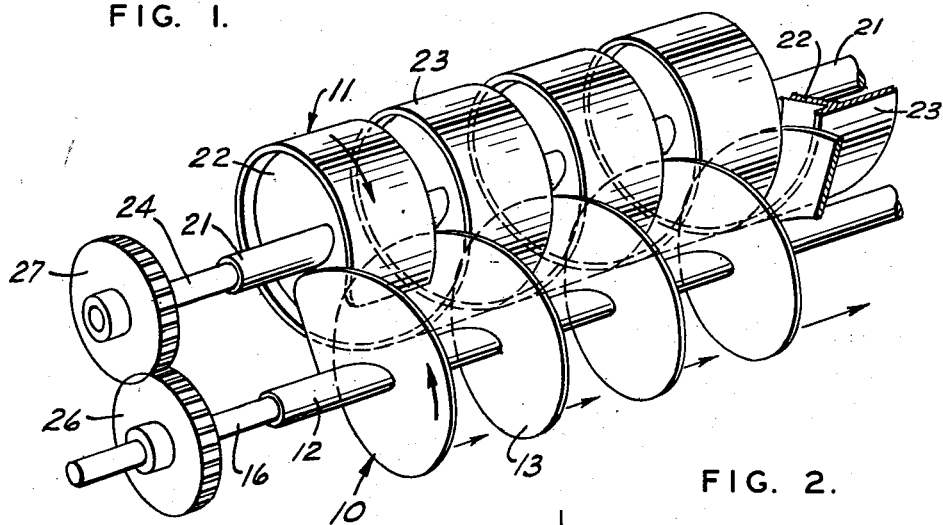
Fig. 1 is a fragmentary view illustrating the operating parts of an embodiment of the invention.
Figure 2:
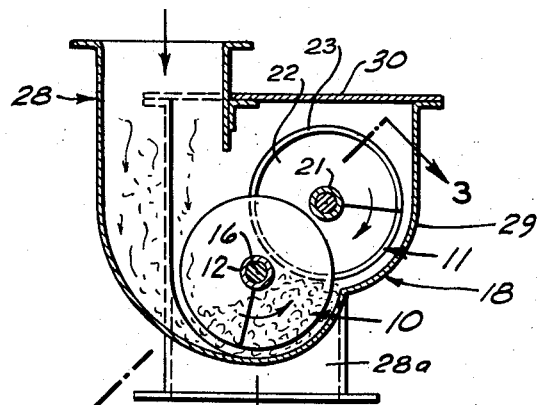
Fig. 2 is a section taken along the line 2—2 of Fig. 3.
Figure 3:
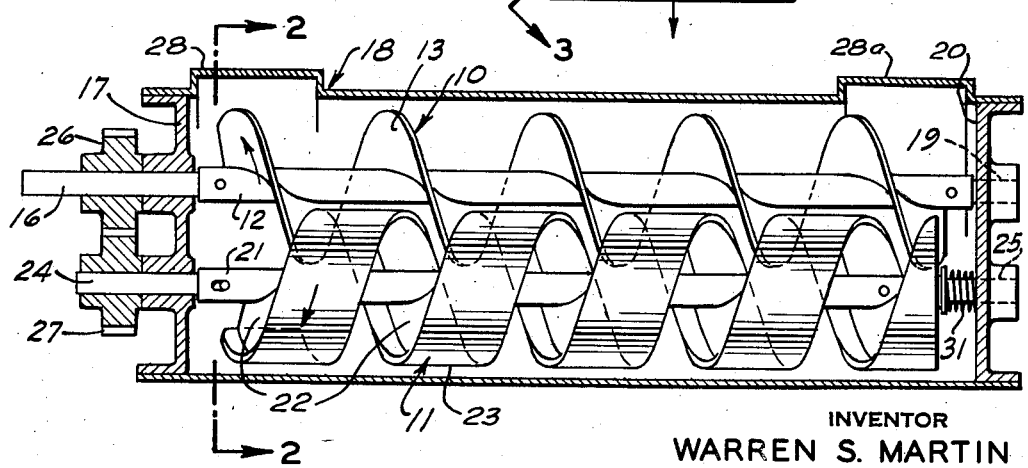
Fig. 3 is a section taken along the line 3—3 of Fig. 2.
Figure 4:
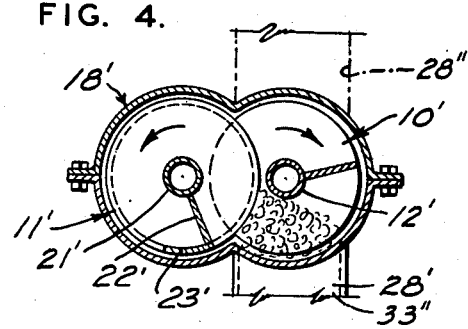
Fig. 4 is a section taken along the line 4—4 of Fig. 6 and 4—4 of Fig. 7.

Referring to Figs. 1, 2 and 3, the operating parts of the conveyor comprise a material-conveying screw 10 and a controlling spiral 11. Said screw 10 comprises a tubular shaft 12 and a helicoid 13. Said helicoid 13 comprises a strip or blade of substantially uniform width and thickness arranged edgewise in helical form around said tubular shaft 12 and with its inner edge attached to said shaft 12. The screw 10 thus takes the form of a right-hand pitch screw with a rectangular thread and each convolution of the thread or helix forming a conveying flight. In order to feed material to the right in Fig. 1, said screw 10 must be turned counterclockwise as indicated by the arrow at the left of Fig. 1. As illustrated the left and right ends (Fig. 3) of said tubular shaft 12 are mounted respectively on shafts 16 passing through the left end 17 of casing 18, and shaft 19 journalled in right end 20 of said casing 18.

Parallel to said tubular shaft 12 is a tubular shaft 21 of said controlling or blocking spiral 11 which also includes a helicoid member 22 similar to helicoid 13, having correlative convolutions but of opposite pitch. Said helicoid member 22 is secured to shaft 21 and provides a support for a cylindrical open spiral member or shell formed of a flat strip or blade 23 arranged in helical form around the periphery of said helicoid 22 and secured thereto. Said strip or blade 23 is arranged to correspond to a left hand screw and is of such width that it enters the spaces between the convolutions or flights of helicoid 13 in a loose intermeshing relation and with sufficient clearance to avoid jamming. Said tubular shaft 21 is mounted in ends 17 and 20 by means of shafts 24 and 25 journalled in ends 17 and 20. Mounted on shafts 16 and 24 respectively are intermeshing gears 26 and 27 respectively which cause screw 10 and spiral 11 to operate in opposite directions, simultaneously and at the same speed. The drive of both of said screw and spiral may be effected by a suitable source of power acting on shaft 16.

The casing 18 may be supported by said ends 17 and 20 and, except for a feed hopper 28 and a discharge spout 28a, is enclosed at the sides and bottom by casing member 29 which is curved so as to pass close to said spiral 11 and then close to the bottom of conveyor screw 10 before reaching the opposite side of the casing. The top of the casing 18 is normally closed by a cover 30.

It will be evident that the material will normally be at the rear edge of strip or blade 23 which cooperates with the leading faces of helical flights 13 and that this location is the one where jamming is likely to occur. In order to relieve any jam which may occur the shaft 21 carrying blade 23 is slidably mounted for limited axial movement and is urged to the left toward flights 13 by a spring 31 (right of Fig. 3). When a jam occurs, the shaft 21 or other similar support to blade 23 may be forced to the right, compressing the restraining spring 31, to free the apparatus. The effort of the spring 31 will effect pressure upon the object producing the jam and thereafter return the blade 23 to a normal position when the said object is dislodged.

With dry granular materials it would ordinarily be unnecessary to use control spiral 11 for horizontal conveying. However, if the material to be transferred adheres to the conveyor screw 10, the control spiral 11 would be very desirable.

The screw conveyor element 10' disclosed in Figs. 4, 5, 6 and 7, would not, however, work to convey even dry granular material upwardly in the described manner without the control spiral 11'. Also in conveyors such as those shown in Figs. 6 and 7, it is found desirable to enclose the screw and spiral by a reasonably close-fitting casing 18' in Fig. 4. Where the conveyor works vertically or at a considerable inclination from the horizontal, the material instead of resting on the bottom of a trough, rests mostly on the blades or flights of the helicoid 13' at the bottom of each compartment set off by the blade of the spiral 11' and the casing; the material will gradually be forced upwardly as the compartment rises.

Figure 6:
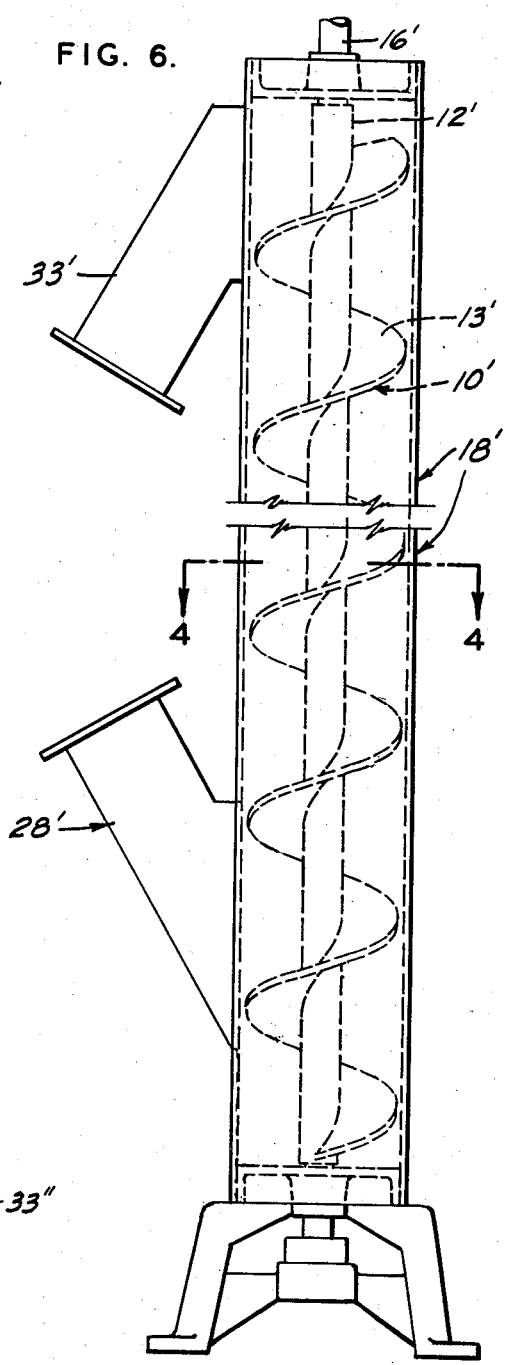
Fig. 6 is a view in elevation illustrating an embodiment of the invention for feeding material vertically.

In Fig. 6 there is illustrated a vertical conveyor with a hopper 28' to supply material to the bottom of the conveyor and a discharge spout or chute 33' at the top of the casing 18'.

Figure 7:
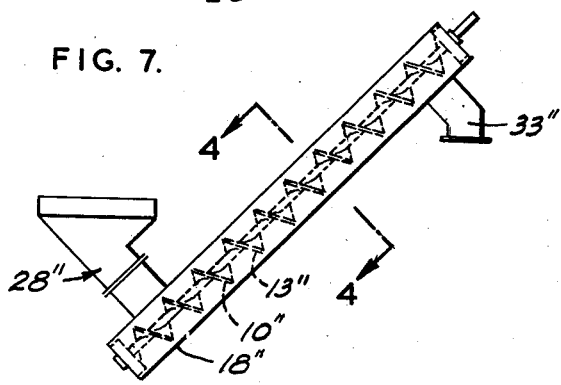
Fig. 7 is a side elevation of an embodiment of the invention for conveying material in an upwardly inclined direction.

In Fig. 7 the essential parts are the same as in Fig. 6 but due to the inclination of the spiral elements, the supply hopper 28" is on the upper side of the lower end and the discharge spout 33" at the lower side of the upper end.

Said screw 10 may be referred to as a screw conveyor and formed of helicoid convolutions or helical flights carried by an axial core or shaft 12. Said controlling spiral 11 may be referred to as a cylindrical spiral shell, or a hollow cylindrical shell having a slot or space between the convolutions of the spiral or blade 23. The intermeshing portions of spiral 23 form peripheral working surfaces which cooperate with the leading faces of the corresponding helical flights of conveyor screw 10 to force the material to advance along said conveyor screw.

The construction of the screw 10 closely resembles the well-known standard conveyor screws in which the helicoid flights are preferably formed from a relatively thin strip of metal and after forming, the thickness of the flight may be uniform or slightly greater at the axial shaft than at the periphery. The axial pitch angle of the helicoid flight 13 is naturally much greater at the axial shaft than at the periphery, while the intermeshing shell 23 follows a uniform pitch angle since it is formed to a cylindrical surface. Where the screw 10 and spiral 23 are of identical diameters having true opposite pitch and intermeshed in parallel, the peripheral edges of the two elements will have corresponding space relation at all points of entry and departure in the path of intermeshing the confines of each other. However, the helical space between the convolutions of helicoid flights 13 is not a true mate with respect to the periphery of spiral 23 due to the varying axial pitch angle of the helicoid 13 as it varies from a true likeness at the periphery to a much steeper angle when measured near the shaft 12.

In order to overcome the beforementioned helical space conditions near shaft 12, the intermeshing elements of screw 10 and shell 23 shall be provided with sufficient looseness or space relation to avoid interference. An improved form of the present invention may be provided by forming the helical leading face of screw 10 to conform generally with the adjacent peripheral edge of the intermeshing working surfaces of spiral 23 thus obviating a wedge shaped space therebetween.

When conveying granular bearing material the space between the correlative elements of the leading face of helicoid 13, shell 23, core 12 and casing 18 would be sufficient to allow slippage of material to avoid binding and grinding.

Figure 5:
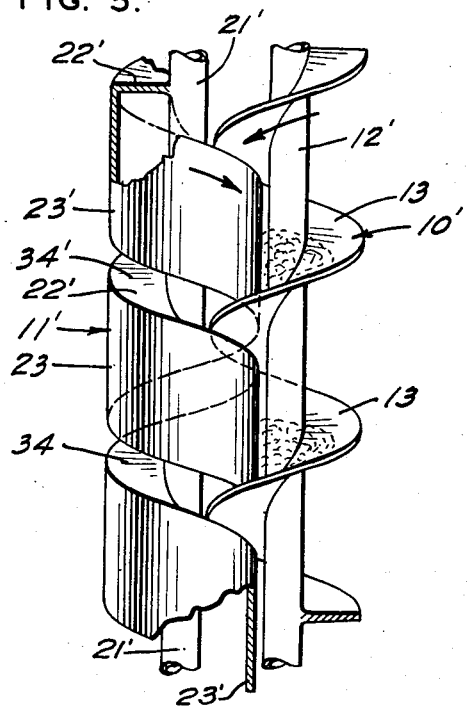
Fig. 5 is a fragmentary view illustrating the assembly of the screw conveyor and the control spiral.

The hollow cylindrical spiral shell 23 is the principal conveying element of spiral 11 and may be supported by various means other than said helicoid 22. The principal advantage of utilizing a helicoid 22 as a support member is an economical method of manufacture; however when said helicoid support 22' is positioned at the forward end of blade 23' as shown by Fig. 5, it may tend to reduce the void adjacent to the trailing surface of helicoid 13' and eliminate a dead space which would otherwise become filled with statical material. With particular applications of the present conveyor of relatively short length, the helicoid support 22 and the central portion of shaft 21 may be omitted. In such use the spiral shell 23 would be formed of material of sufficient thickness and rigidity to facilitate supporting and driving from one end.

It should be understood that various changes can be made and that certain features can be made without others without departing from the true scope and spirit of the invention.

What is claimed is:

1. A material elevating conveyor comprising a conveyor screw formed of helicoid convolutions carried by an axial core, a cylindrical spiral shell having convolutions correlative with said conveyor screw but of opposite pitch mounted to rotate in parallel and intermeshing with said conveyor screw, a casing enclosing said conveyor screw and shell with a trough portion directing the material to said conveyor screw from the inlet opening near the lower end to the discharge opening near the upper end, and means for driving said conveyor screw and shell simultaneously by rotary movement at the same speed but in opposite directions, the cylindrical surface of the intermeshing side of each convolution of said shell forming a running material barrier across the leading face of each corresponding convolution of said conveyor screw thus forcing the material to advance along the convolutions of said conveyor screw.

2. A material conveyor according to claim 1 whereby said spiral shell is driven by an axial shaft and is slidably mounted for limited axial movement with a restraining spring tending to hold the peripheral edge of said shell in a fixed running relation to the feeding face of said conveyor screw but yielding to relieve a condition of jamming.

3. A material conveyor comprising a screw conveyor formed of helical flights carried by an axial core, and a hollow cylindrical shell having a cooperating helical slot of opposite pitch mounted to rotate at the same speed in opposite direction of said screw conveyor and in loose intermeshing relationship therewith; said slotted shell forming intermeshing peripheral working surfaces, whereby the working surfaces of the slotted shell in cooperation with the leading face of each corresponding helical flight of said screw conveyor force the material to advance along said conveyor.

4. A material conveyor according to claim 3 wherein said slotted shell is rotatably driven by an axial shaft and is slidably mounted for limited axial movement with a restraining spring tending to hold the said working surfaces of said slotted shell in a fixed running relation to the leading face of each corresponding helical flight of said screw conveyor but yielding axially to relieve a condition of jamming therebetween.

5. A material conveyor according to claim 3 wherein the leading faces of said helical flights conform generally with the corresponding adjacent peripheral edges of said intermeshing working surfaces of said slotted shell thus obviating wedge shaped spaces therebetween.

6. A material conveyor comprising a screw conveyor formed of helical flights carried by an axial core, a casing in which said screw conveyor is mounted to rotate, said casing having a trough portion directing the material to said screw conveyor from the material inlet to the discharge, and a hollow cylindrical shell having a cooperating helical slot of opposite pitch mounted to rotate at the same speed in opposite direction of said screw conveyor and in loose intermeshing relationship therewith; said slotted shell forming intermeshing peripheral working surfaces, whereby the working surfaces of the slotted shell in cooperation with the leading face of each corresponding helical flight of said screw conveyor force the material to advance along said conveyor.

7. A material conveyor according to claim 6 wherein said slotted shell is rotatably driven by an axial shaft and is slidably mounted for limited axial movement with a restraining spring tending to hold the said working surfaces of said slotted shell in a fixed running relation to the leading face of each corresponding helical flight of said screw conveyor but yielding axially to relieve a condition of jamming therebetween.

8. A material conveyor according to claim 6 wherein the leading faces of said helical flights conform generally with the corresponding adjacent peripheral edges of said intermeshing working surfaces of said slotted shell thus obviating wedge shaped spaces therebetween.

9. A material conveyor comprising a screw conveyor formed of helical flights carried by an axial core, a hollow cylindrical shell having a cooperating helical slot of opposite pitch mounted to rotate in parallel and in loose intermeshing relationship with said screw conveyor, and means for driving said screw conveyor and said slotted shell in opposite directions simultaneously at the same rotary speed; said slotted shell forming intermeshing peripheral working surfaces, whereby the working surfaces of the slotted shell in cooperation with the leading face of each corresponding helical flight of said screw conveyor force the material to advance along said conveyor.

References Cited in the file of this patent

UNITED STATES PATENTS

| Number | Name | Date |
|---|---|---|
| 852,833 | Farquhar | May 7, 1907 |
| 1,069,404 | Fiddyment | Aug. 5, 1913 |
| 1,415,061 | Smith et al. | May 9, 1922 |
| 1,468,379 | Easton | Sept. 18, 1923 |
| 2,173,414 | Fulton | Sept. 19, 1939 |
| 2,226,242 | Harrington | Dec. 24, 1940 |
| 2,632,203 | Laubarede | Mar. 24, 1953 |